Dec. 18, 1923. 1,478,172

J. CLARK

WROUGHT METAL REPAIR DEVICE FOR PIPE LINES

Filed June 19, 1922    3 Sheets-Sheet 1

Inventor
James Clark
By his Attorney
Louis Prevost Whitaker

Dec. 18, 1923.

J. CLARK

1,478,172

WROUGHT METAL REPAIR DEVICE FOR PIPE LINES

Filed June 19, 1922   3 Sheets-Sheet 2

Inventor
James Clark
By his Attorney

Patented Dec. 18, 1923.

1,478,172

UNITED STATES PATENT OFFICE.

JAMES CLARK, OF BRADFORD, PENNSYLVANIA, ASSIGNOR TO S. R. DRESSER MANUFACTURING COMPANY, OF BRADFORD, PENNSYLVANIA, A CORPORATION OF PENNSYLVANIA.

WROUGHT-METAL REPAIR DEVICE FOR PIPE LINES.

Application filed June 18, 1922. Serial No. 569,848.

*To all whom it may concern:*

Be it known that I, JAMES CLARK, a citizen of the United States, residing at Bradford, in the county of McKean and State of Pennsylvania, have invented certain new and useful Improvements in Wrought-Metal Repair Devices for Pipe Lines; and I do hereby declare the following to be a full, clear, and exact description of the invention, such as will enable others skilled in the art to which it appertains to make and use the same.

My invention consists in the novel features hereinafter described, reference being had to the accompanying drawings which show one embodiment of the same, selected by me for purposes of illustration, and the said invention is fully disclosed in the following description and claims.

The object of my invention is to provide a repair device or split sleeve which is employed principally to stop a leak in a pipe line without necessitating cutting off the flow of material through the pipe line or disturbing the pipe sections adjacent to the leak. These leaks usually occur at a joint in the pipe line, as where adjacent pipe sections are connected by a screw collar or other form of coupling, and a leak has developed between the collar and one of the pipe sections, or by injury to or defect in the screw collar or other form of pipe coupling. The repair sleeve is therefore usually constructed of sufficient diameter internally to enclose the entire joint, that is to say, the screw collar or other coupling, and the portions of the pipe adjacent thereto, the sleeve being made in sections divided longitudinally and secured together by bolts to facilitate the placing of the sleeve over the defective joint, and having packing between the longitudinal edges of the sleeve, said sleeve being employed in conjunction with clamping rings or followers, also made in sections and properly secured together, the said followers being employed to compress the end packings so as to make a tight joint between the sleeve and the pipe at opposite ends of the enclosed pipe coupling or broken place in the pipe to be repaired. As these repair sleeves are employed very frequently in places extremely difficult of access and are necessarily handled to a large extent in placing and assembling them on the pipe line, by the hands of the operators, it is extremely important that these sleeves should be made as light as possible, while at the same time they must have great strength and be entirely impervious in order to withstand the high internal pressures to which they are usually subjected.

According to my invention, I construct my improved split sleeve entirely of wrought metal, thereby obviating the possibility of porosity of material which necessarily exists in many cases where cast metal parts are employed. I also construct the sleeve of separate parts as hereinafter described, which are united by welding, brazing, or otherwise, and preferably by electric welding, thereby producing the desired form with a minimum amount of metal, while preserving the strength of the sleeve and materially cheapening the cost of constructing the same.

In the accompanying drawings, in which I have illustrated one form of my improved repair device, selected by me for the purpose of illustrating my invention.

Figure 7:
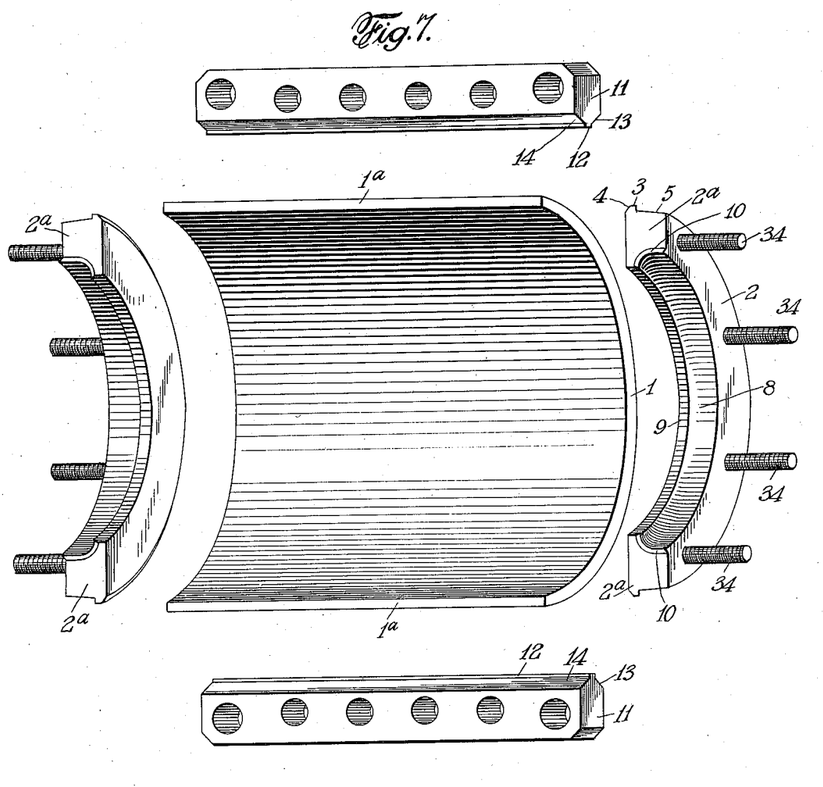
Fig. 7 is a detail view showing the parts going to make up one of the segmental sections of the split ring before they are assembled and united by welding.

My improved split sleeve comprises a plurality of segmental sections usually two sections, comprising the complete sleeve, although a greater number may be employed if desired. Each of these sections comprises, as indicated in Fig. 7, the following elements or members. 1 represents the shell or body portion, which is formed of wrought metal preferably steel, and bent or curved into the form of a segment of a cylinder. 2—2 represent end pieces also formed of wrought metal preferably steel, of a cross section substantially as indicated in Fig. 7, and bent into semi-circular form, the exterior curved face of each end piece being provided with an annular rib or flange, 3, which fits the inner face of the curved body segment, 1, and the outer face of the end pieces being provided with an inner inclined shoulder, 4, and a longer exterior shoulder, 5. The end pieces are placed in engagement with the inner face of the body segment, 1, with the rib or flange, 3, in engagement therewith, and the end face of the end piece substantially in alignment with the end of the body segment, and the end pieces are united to the body segment, 1, by brazing or welding, and preferably by electric welding. It will be seen that the inclined shoulders, 4 and 5, form recesses on opposite sides of the rib or flange, 3, and these recesses are filled with metal in welding or brazing the end pieces in position. Preferably they are filled, as herein shown at 6 and 7, by fillets, which are caused by flow into them by the melting of the welding rod in the ordinary process of electric welding, thereby integrally uniting the end pieces to the body segments, 1, and forming an absolutely tight sleeve section. Each of the end pieces is provided with a segmental recessed portion, indicated at 8, adapted to form part of an annular end packing recess at the opposite ends of the sleeve when the segments are united, and the inner edge, 9, of the end piece forms part of the pipe aperture which surrounds the pipe section of the pipe line to which the sleeve is applied. At each end of the end piece, 2, a bevelled portion, 10, is formed at the opposite ends of the packing recess, 8, for a purpose hereinafter explained. The end pieces can readily be formed from stock of wrought metal rolled to substantially the section indicated, and cut off in suitable lengths, and bent into semi-circular form. After the end pieces are welded in position, I prefer to true up the faces, 9, forming part of the pipe aperture, the segmental recesses, 8, forming part of the annular end packing recesses, and also the longitudinal edges, 1ª, and the end faces, 2ª, of the body segment and end pieces respectively, by machining, so as to insure an accurate fit of the parts when united into the complete sleeve formation and supplied with side rubbers, hereinafter described, and also to insure the proper fit of the end pieces around the pipe with as little clearance as possible, and the proper fit of the end packings or gaskets in the packing recesses thereof. It is not absolutely necessary to machine these parts, but I prefer to do so as it enables me to reduce the amount of rubber in the side and end packings, and materially increases the economy in the manufacture of these devices.

Figure 2:
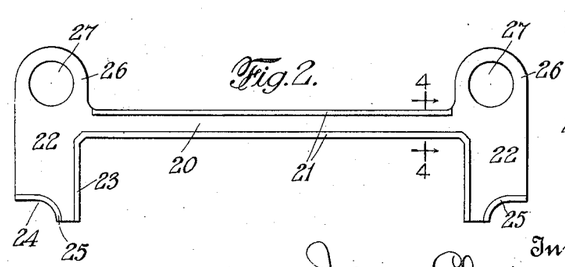
Fig. 2 is a plan view of one of the side packings for the split sleeve.
Figure 3:
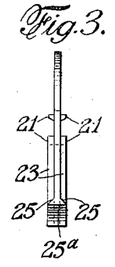
Fig. 3 is an end view of the same.
Figure 4:
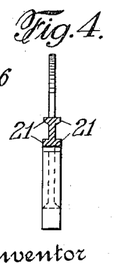
Fig. 4 is a sectional view on line 4—4 of Fig. 2, looking in the direction of the arrows.
Figure 6:
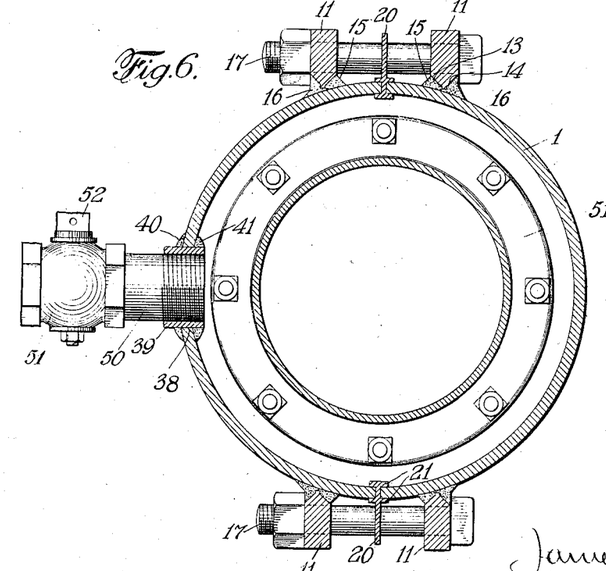
Fig. 6 is a central transverse section through the same.

Each of the body segments, 1, of the sleeve is provided, adjacent to each of its longitudinal edges, with a side flange or bar, indicated at 11, the inner faces of which are preferably provided with a central longitudinal rib or flange, 12, to engage the exterior face of the body segment, 1, and having inclined shoulders, 13 and 14, on opposite sides of this longitudinal rib, so that when the said flanges are placed in position, the rib, 12, engages the exterior surface of the body segment, 1, and recesses are formed between the body segment and the inclined shoulders, 13 and 14, as clearly indicated in Fig. 6. These side bars are united to the body segments, 1, by brazing or welding, and preferably by electric welding, fillets of metal, indicated at 15, and 16, being run in to fill the recesses before referred to, and being preferably formed from the welding rod in the ordinary electric welding machine. The side bars are provided with a plurality of bolt holes, six of which are shown in the specimen illustrated in the accompanying drawings, although the number is not material. I prefer to employ a slightly larger bolt at each end of each of the side bars, although this is not essential. The segments of the sleeve are united as hereinafter described. The side bars are connected by bolts, indicated at 17 and 18, 18 representing the bolts at each end of the side bar, and for convenience of assembling the parts, I prefer to provide one side bar of each segment of the sleeve, or both side bars of one segment, with bolts, 18, welded or otherwise secured in position with respect to the segment, so that they may act as dowels in supporting the side packings and assembling the segments, and hold the parts temporarily in assembled position before the bolts, 17, are inserted and tightened. All the bolts will be provided with suitable nuts, indicated at 19. The side packings, one of which is illustrated in detail in Figs. 2, 3 and 4, preferably are formed of rubber and consist of a longitudinal strip, 20, provided on opposite faces at the inner and outer edges thereof with flanges, 21, 21, to engage the inner and outer faces of the longitudinal edges of the meeting portions of the body segments, 1. At each end of the strip, 20, is a flat portion, 22, of a size corresponding to the end face of one of the end pieces, and the adjacent portion of the edge of the segment, 1, the inner edge of this flat strip being provided on both faces with a flange, 23, connecting with the inner flanges, 21, and each of these flat portions is also cut away, as indicated at 24, to conform to the sections of the end packing recess, and this recessed portion, 24, is provided on both faces with an edge flange, 25, preferably beveled so as to fit the bevelled portions, 10, at opposite ends of the end pieces, and thus form a hermetical seal at the inner face of the annular end packing groove or recess when the parts are assembled. Each of the flat portions, 22, of the side packing, is also preferably provided with an ear, 26, having a bolt aperture, 27, therein, which fits over the permanently secured bolts 18—18, at opposite ends of the side bars, so as to position the side packings and facilitate their proper engagement with the metal parts in assembling the sleeve. 30 represents the end packings which are annular when in place, but are preferably cut on a bevel to facilitate their being placed around the pipe section, and the bevelled ends are joined to make them endless in the packing recess. In connection with the sleeve and end packings, I employ two followers or clamping rings, each of which is provided with a cylindrical packing engaging portion 31, and a perpendicular clamping flange portion, 32, which is provided with bolt holes, 33. In order to locate the clamping bolts as near the pipe as possible, I prefer to provide end pieces, 2, with threaded apertures, into which the clamping bolts, 34, are screwed, or said bolts may be secured to the end pieces in any other desired way. The followers are also made in two (or more) pieces or segments, and are provided with bolt holes to fit the bolts, 34, which are provided with nuts, 35, for drawing down the followers and compressing the end packings or gaskets, 30. In order to secure the segments of the clamping ring together, I prefer to employ, in connection therewith, bridge pieces, 36, which are provided with bolts or pins, 37, for engaging locking apertures in the segments of the followers, in a manner similar to that illustrated in my former Letters Patent of the United States #1,062,438, dated May 20th, 1913, the said bridge pieces being provided with apertures for the passage of clamping bolts and the line of division between the segments of the clamping ring passing through certain of the bolt holes therein, as described in said Letters Patent, or the bridge pieces may be bolted, riveted, or otherwise secured to the segments of the followers in any preferred manner. I prefer, as stated in my former patent, to secure each bridge piece to one segment of the follower, so as to facilitate the assembly of the followers around the pipe sections, and to prevent the separation of the bridge pieces from the segments in transportation, but this is not essential.

Figures 5, 8:
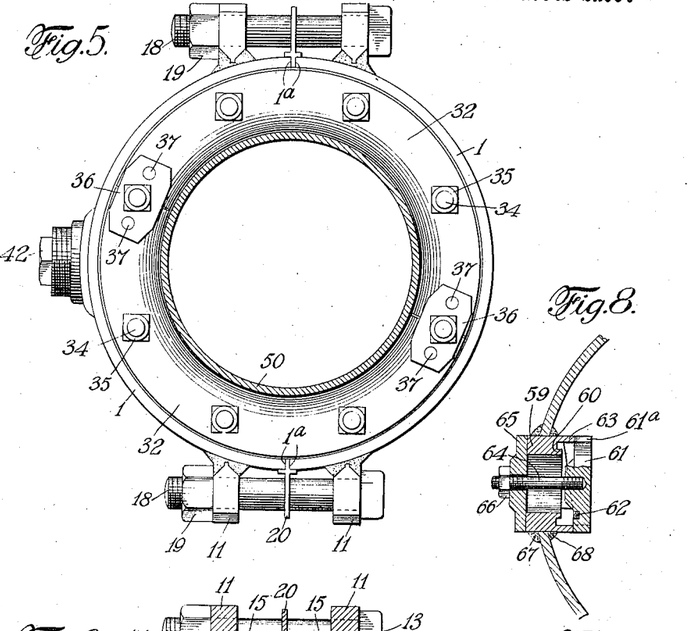
Fig. 5 represents an end view of the complete repair device looking toward one of the followers.
Figures 8 and 9 are detail views showing a different type of vent valve.

These repair sleeves are usually installed over a leaking coupling in a high pressure line from which gas or other fluid is escaping. In order to facilitate the application of my improved split sleeve, it is very desirable to provide the sleeve with means for relieving the pressure inside of it during the assembling and tightening of the parts of the sleeve as otherwise the gas or other fluid would escape around the packings, and would blow them out of position before the sleeve could be made tight. I therefore prefer to provide at least one of the body segments with a vent aperture, provided with a cut-off valve, which can be maintained in open position to allow escape of the gas or other fluid until after the parts of the sleeve have been assembled and tightened when said valve may be closed to stop any further leakage. In this instance, I have shown one of the body segments provided with a circular aperture bored therein, as indicated at 38 in Figure 6, in which is fitted an internally screw threaded collar 39, secured in position by brazing or welding, and preferably by electric welding, fillets 40 and 41 being formed around the collar 39, both inside and outside of the body segment 1. Into this collar is screwed a stop-cock 51 of any desired form. In Figure 6, I have shown the cock 51 provided with a rotary plug having a head 52 or stem, which can be turned by means of a wrench or other suitable tool. This cock can remain open during the assembling and tightening of the parts of the sleeve, to permit the escape of gas or other pressure fluid, and can then be turned off or closed after the sleeve has been made tight, thus preventing any further leakage. If the sleeve is to be used in a position where the cock 51 or its equivalent is not needed, the collar 39 can be closed by an ordinary screw plug 42 as shown in Figure 5.

Figure 9:
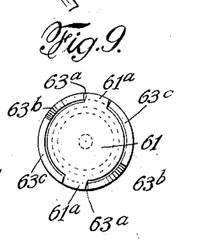

In some instances, instead of the ordinary stop-cock 51, I may provide the collar which is set into the vent opening of the sleeve with a valve of the kind illustrated in my former patent, No. 1,165,388 dated December 28th 1915. In Figures 8 and 9 I have illustrated a valve of this kind applied to a collar indicated at 59 to be inserted and secured in the vent aperture of one of the body segments of the sleeve here indicated at 1ª. The collar 59 is provided with an annular valve seat 60 to be engaged by a valve 61, which may be provided with an annular packing recess containing an annular packing 62. The collar 59 is provided with an annular flange 63 surrounding valve 61, and having portions of different heights, the high portions indicated at 63ª being located opposite each other in position to be engaged by lugs 61ª projecting on opposite sides of the valves 61. The high portions 63ª are connected by inclined portions 63ᵇ with low portions 63ᶜ, and when the valve 61 is turned upon its axis so as to bring the lugs 61ª into alignment with the low portions 63ᶜ of the flange 63, the valve can seat, but when the valve is turned so as to bring the lugs 61ª into engagement with the high portions 63ª of the flange 63, the valve will be held open. The valve 61 is provided with a stem 64, which may be formed integrally therewith or as a separate part screw threaded thereto. This stem extends through a cap or cross bar 65 on the outer end of the collar 59, and is preferably threaded, and provided with a nut 66, which can be screwed down tight to hold the valve permanently in seated position. I prefer to form the collar and associated parts as a unit, and to insert the collar in the vent opening of the body member 1ª and secure it thereto by brazing or welding, and preferably by electric welding, and by forming fillets 67 and 68 from the welding rod of the welding machine on the inner and outer faces of the body segment 1ª which connect the sleeve 59 permanently with the body segment 1.

Figure 1:
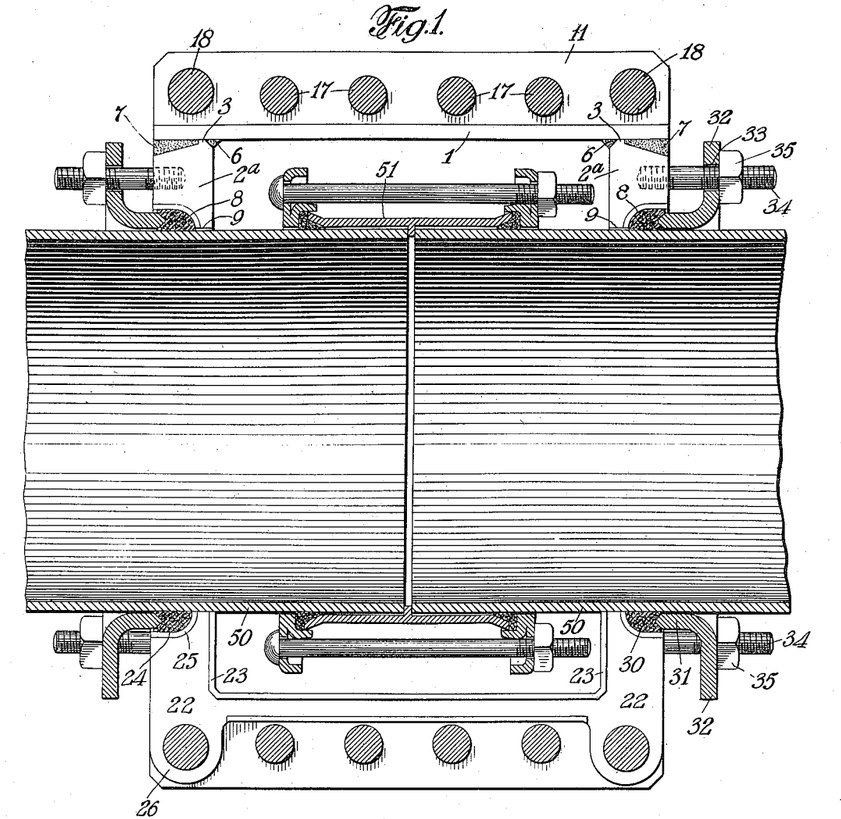
Fig. 1 represents a sectional view of the split sleeve, end packings and followers, taken on the line of separation between adjacent segmental portions of the sleeve, one of the side packings of the sleeve being removed, and the repair device being shown applied to a pipe line and enclosing a rubber packed pipe coupling uniting the ends of plain end pipe sections.

In Fig. 1 I have shown my improved repair device applied to a pipe line consisting of plain end pipe sections, which in this instance are united by a rubber packed pipe coupling of the type shown in the United States Letters Patent of Solomon R. Dresser, No. 884,371, dated April 14, 1908. It will be understood, however, that the device is equally applicable to pipe lines, the sections of which are connected in any other usual or preferred manner, such as by screw couplings, flange couplings, bell and spigot couplings, or otherwise, the internal diameter of the body sections, 1, and the repair sleeve being sufficient to permit the coupling to be entirely enclosed within the sleeve.

Assuming that a leaky joint has been discovered in a pipe line, which it is desired to repair, an excavation is made around the leaky joint, of sufficient size to permit the insertion of the repair sleeve. The segments of the sleeve, provided with the side packings hereinbefore described, supported in position by engagement of the ears, 26, and bolt holes, 27, with the end bolts, 18, are placed around the pipe and coupling enclosing the latter, the bolts, 18, of one segment entering the corresponding bolt holes in the side connecting bar of the other segment, and facilitating the assembling of the sleeve and supporting the segments on the pipe line during the assembling. The bolts, 17, are passed through the bolt holes in the adjacent side bars of the sleeve segments and the nuts are drawn up so as to clamp the side packings between the adjacent meeting ends or faces of the body segments or end pieces. The lateral flanges 21 and 23 of the side packings will engage the outer and inner faces of the body segment and the inner faces of the end pieces, as before described, this facilitating the making of a tight joint between the segments and the bevelled ribs, 25, on the side packings will fit into the bevelled portions, 10, in the meeting faces of the end pieces and form a continuation of the end packing recesses. The end packings are now placed around the pipe sections, indicated at 50, and the followers, 32, are connected by their respective bridge pieces and assembled around the pipe sections and made to engage the bolts, 34, and the nuts, 35, are applied to the bolts, 34, and screwed up, compressing the packings, 30, in the packing recess and against the inner edges, 25ª, of the side packings adjacent to the bevelled ribs, 25. This makes an absolutely gas tight joint at each end of the sleeve and connects the sleeve to the pipe sections at opposite sides of the enclosed coupling, here indicated at 51, as a whole, thus stopping any leak that may exist in the coupling or in the pipe adjacent thereto without disturbing the pipe line or interfering with the passage of fluid therethrough.

It will be understood that during the assembling of the parts of the repair sleeve the vent opening will be kept open to permit the discharge of gas or other fluid, and prevent the accumulation of pressure within the sleeve until after the sleeve is tightened when further leakage can be stopped by turning the plug 52 of the cock 51 (see Fig. 6) if that form of valve is employed or by rotating the valve 61 by means of its stem so as to permit it to be closed by the pressure within the sleeve (see Figs. 8 and 9) if the form of valve illustrated in these figures is employed, after which the nut 66 can be screwed tight. It will also be understood that these repair sleeves can be employed for stopping a leak due to an imperfection in the pipe itself, between joints, or otherwise.

It will be noted that all the parts of my improved repair device are of wrought metal and therefore will be entirely impervious and free from this objection to cast iron, which is frequently found to contain or develop blow holes or sand holes, or other imperfections, producing leaks. The construction is also very materially lighter than cast metal, the reduction in weight being approximately one half the weight of a sleeve for the same size pipe formed of case metal and in some cases the reduction of weight is even greater, and this is a matter of great importance, both in the transportation of the sleeves and in installing them, especially in view of the fact, as before stated, that these sleeves are generally used in remote localities and in positions difficult of access, where the parts are obliged to be handled by man power, that is to say, by the hands of the operators. Large size sleeves constructed in accordance with my invention will weigh from 400 to 800 pounds less than cast metal sleeves of corresponding pipe diameters. The construction of my improved sleeve, where the parts are made separately and united by electric welding, in the manner hereinbefore described, results in great economy, while at the same time insures the highest strength and imperviousness of the completed sleeve.

What I claim and desire to secure by Letters Patent is:

1. In a wrought metal repair device for pipe lines, a split sleeve comprising a plurality of segments each consisting of a wrought metal body segment of a cylinder, provided at each end with segmental end pieces of wrought metal welded thereto, and having segmental recesses, forming parts of end packing recesses, formed therein, side flanges of wrought metal welded to said body segments adjacent to their longitudinal edges, side packings engaging the meeting edges of the body segments, and the end portions of the end segments, and bolts for connecting the side flanges.

2. In a wrought metal repair device for pipe lines, a split sleeve comprising a plurality of segments each consisting of a wrought metal body segment of a cylinder, provided at each end with segmental end pieces of wrought metal welded thereto, and having segmental recesses, forming parts of end packing recesses, formed therein, side flanges of wrought metal welded to said body segments adjacent to their longitudinal edges, side packings engaging the meeting edges of the body segments and provided with longitudinal ribs for engaging the inner and outer faces of said edges, and with end portions for engaging the end portions of the end segments, and bolts for connecting the side flanges.

3. In a wrought metal repair device for pipe lines, a split sleeve comprising a plurality of segments each consisting of a wrought metal body segment of a cylinder, provided at each end with segmental end pieces of wrought metal welded thereto, and having segmental recesses, forming parts of end packing recesses, formed therein, side flanges of wrought metal welded to said body segments adjacent to their longitudinal edges, said end segments being provided with bevelled edges at each end adjacent to the end packing recesses thereof, side packings engaging the meeting edges of the body segments and end segments, and provided on opposite faces with longitudinal ribs for engaging the inner and outer faces of the edges of the body segments, and provided on opposite faces with bevelled ribs for engaging the said bevelled portions of the end segments, and bolts for connecting said side flanges.

4. In a wrought metal repair device for pipe lines, a split sleeve comprising a plurality of segments each consisting of a wrought metal body segment of a cylinder, provided at each end with segmental end pieces of wrought metal welded thereto, and having segmental recesses, forming parts of end packing recesses, formed therein, side flanges of wrought metal welded to said body segments adjacent to their longitudinal edges, said end segments being provided with bevelled edges at each end adjacent to the end packing recesses thereof, side packings engaging the meeting edges of the body segments and end segments, and provided on opposite faces with longitudinal ribs for engaging the inner and outer faces of the edges of the body segments, the inner of said ribs being extended along the end portions of said packing to engage the inner faces of the end segments, the end portions of said side packings being cut away in registration with the end packing recesses of the sleeve, and provided on opposite sides with bevelled flanges to engage the bevelled portions of the end segments, and bolts for connecting said side flanges.

5. In a wrought metal repair device for pipe lines, a split sleeve comprising a plurality of segments each consisting of a wrought metal body segment of a cylinder, provided at each end with segmental end pieces of wrought metal welded thereto, and having segmental recesses, forming parts of end packing recesses, formed therein, side flanges of wrought metal welded to said body segments adjacent to their longitudinal edges, said end segments being provided with bevelled edges at each end adjacent to the end packing recesses thereof, side packings engaging the meeting edges of the body segments and end segments, and provided on opposite faces with longitudinal ribs for engaging the inner and outer faces of the edges of the body segments, the end portions of the packings being provided with extensions having bolt holes therein, and being cut away to register with the end packing recesses of the sleeve, and bolts for connecting said side flanges, a bolt at each end of said flanges engaging one of the bolt holes in the adjacent side packing for positioning it.

6. In a wrought metal repair device for pipe lines, a split sleeve comprising a plurality of segments each consisting of a wrought metal body segment of a cylinder, provided at each end with segmental end pieces of wrought metal welded thereto, and having segmental recesses, forming parts of end packing recesses, formed therein, side flanges of wrought metal welded to said body segments adjacent to their longitudinal edges, said end segments being provided with bevelled edges at each end adjacent to the end packing recesses thereof, side packings engaging the meeting edges of the body segments and end segments, and provided on opposite faces with longitudinal ribs for engaging the inner and outer faces of the edges of the body segments, the end portions of the packings being provided with extensions having bolt holes therein, and being cut away to register with the end packing recesses of the sleeve, said side packings being provided at each end with transversely disposed faces to engage the inner face of the end segments and being provided on opposite faces with bevelled flanges to engage the bevelled portions of the end segments, and bolts for connecting said side flanges, one of said bolts at each end of said flanges passing through a bolt hole in the adjacent side packing.

7. In a wrought metal repair device for pipe lines, a split sleeve comprising a plurality of segments, each consisting of a wrought metal body plate curved to form a segment of a cylinder, and provided at each end with a curved segmental end piece of wrought metal having an exterior shoulder to engage the inner face of the said plate, and having reduced portions on opposite sides of said shoulder, said end segments being welded to said plate and provided with fillets between said reduced portions and the plate, said end segments being provided with segmental recesses forming parts of the end packing recesses of the sleeve, side packings interposed between the meeting edges of the body plates and the end faces of the end segments, and means for uniting said segments, and clamping the side packings between them.

8. In a wrought metal repair device for pipe lines, a split sleeve comprising a plurality of segments, each consisting of a wrought metal body plate curved to form a segment of a cylinder, and provided at each end with a curved segmental end piece of wrought metal having an exterior shoulder to engage the inner face of the said plate, and having reduced portions on opposite sides of said shoulder, said end segments being welded to said plate and provided with fillets between said reduced portions and the plate, said end segments being provided with segmental recesses forming parts of the end packing recesses of the sleeve, side packings interposed between the meeting edges of the body plate and the end faces of the end segments, side flanges welded to said body plates adjacent to and parallel to the longitudinal edges thereof, and bolts for connecting said flanges for clamping said segments upon the side packings.

9. In a wrought metal repair device for pipe lines, a split sleeve comprising a plurality of segments, each consisting of a wrought metal body plate curved to form a segment of a cylinder, and provided at each end with a curved segmental end piece of wrought metal having an exterior shoulder to engage the inner face of the said plate, and having reduced portions on opposite sides of said shoulder, said end segments being welded to said plate and provided with fillets between said reduced portions and the plate, said end segments being provided with segmental recesses forming parts of the end packing recesses of the sleeve, side packings interposed between the meeting edges of the body plate and the end faces of the end segments, side flanges extending adjacent to the longitudinal edges of said body plates, and provided with bevelled portions on opposite sides, said flanges being welded to said body plates and fillets being welded between said bevelled portions of the side flanges and the body plates, and bolts for connecting said side flanges and clamping the segments upon said side packings.

10. In a wrought metal repair device for pipe lines, a split sleeve, comprising a plurality of segments each consisting of a wrought metal body segment of a cylinder, provided at each end with segmental end pieces of wrought metal welded thereto, and having segmental recesses, forming parts of end packing recesses, formed therein, side flanges of wrought metal welded to said body segments adjacent to their longitudinal edges, side packings engaging the meeting edges of the body segments, and the end portions of the end segments, bolts for connecting said side flanges, and bolts secured to and projecting from said end segments for engaging followers.

11. In a wrought metal repair device for pipe lines, a split sleeve, comprising a plurality of segments each consisting of a wrought metal body segment of a cylinder, provided at each end with segmental end pieces of wrought metal welded thereto, and having segmental recesses, forming parts of end packing recesses, formed therein, side flanges of wrought metal welded to said body segments adjacent to their longitudinal edges, side packings engaging the meeting edges of the body segments, and the end portions of the end segments, bolts connecting said side flanges, end packings engaging said end packing recesses in said end segments, followers provided with portions for engaging said end packings, and with lateral flanges, and bolts and nuts engaging said lateral flanges.

12. In a wrought metal repair device for pipe lines, a split sleeve, comprising a plurality of segments each consisting of a wrought metal body segment of a cylinder, provided at each end with segmental end pieces of wrought metal welded thereto, and having segmental recesses, forming parts of end packing recesses, formed therein, side flanges of wrought metal welded to said body segments adjacent to their longitudinal edges, side packings engaging the meeting edges of the body segments, and the end portions of the end segments, bolts connecting said side flanges, end packings engaging said end packing recesses in said end segments, followers provided with portions for engaging said end packings, and with lateral flanges, bolts secured at one end to said end segments, and extending through apertures in said lateral flanges of the followers, and nuts engaging said bolts.

13. In a wrought metal repair device for pipe lines, a split sleeve, comprising a plurality of segments each consisting of a wrought metal body segment of a cylinder, provided at each end with segmental end pieces of wrought metal welded thereto, and having segmental recesses, forming parts of end packing recesses, formed therein, side flanges of wrought metal welded to said body segments adjacent to their longitudinal edges, side packings engaging the meeting edges of the body segments, and the end portions of the end segments, bolts connecting said side flanges, end packings engaging said end packing recesses in said end segments, followers provided with portions for engaging said end packings, and with lateral flanges, bolts having threaded portions tapped into said end segments, and portions extending through bolt holes in the flanges of the followers, and nuts engaging said bolts.

14. In a wrought metal repair device for pipe lines, a split sleeve comprising a plurality of segments each consisting of a wrought metal body segment of a cylinder, provided at each end with segmental end pieces of wrought metal welded thereto, and having segmental recesses, forming parts of end packing recesses, formed therein, side flanges of wrought metal welded to said body segments adjacent to their longitudinal edges, said end segments being provided with bevelled edges at each end adjacent to the end packing recesses thereof, side packings engaging the meeting edges of the body segments and end segments, and provided on opposite faces with longitudinal ribs for engaging the inner and outer faces of the edges of the body segments, the inner of said ribs being extended along the end portions of said packing to engage the inner faces of the end segments, the end portions of said side packings being cut away in registration with the end packing recesses of the sleeve, and provided on opposite sides with bevelled flanges to engage the bevelled portions of the end segments, and bolts for connecting said side flanges, end packings in said end packing recesses, bolts tapped into said end segments and projecting therefrom, followers provided with packing engaging portions and clamping plates provided with bolt holes to engage said projecting bolts, and nuts engaging said bolts.

15. In a wrought metal repair device for pipe lines, a split sleeve comprising a plurality of segments each consisting of a wrought metal body segment of a cylinder provided at each end with segmental end pieces of wrought metal, welded thereto and having segmental recesses forming parts of end packing recesses, formed therein, side flanges of wrought metal welded to said body segments adjacent to their longitudinal edgings, side packings engaging the meeting edges of the body segments, and the end portions of the end segments, bolts for connecting said side flanges, one of said body segments being provided with a vent aperture, a collar located in said aperture and welded to said body segment, and a vent valve connected with said collar for closing said vent aperture.

16. In a wrought metal repair device for pipe lines, a split sleeve comprising a plurality of segments each consisting of a wrought metal body segment of a cylinder provided at each end with segmental end pieces of wrought metal, welded thereto and having segmental recesses forming parts of end packing recesses, formed therein, side flanges of wrought metal welded to said body segments adjacent to their longitudinal edgings, side packings engaging the meeting edges of the body segments, and the end portions of the end segments, bolts for connecting said side flanges, one of said body segments being provided with a vent aperture, a collar located in said aperture, fillets surrounding said collar within and without the wall of said body segment, and welded to the collar and to said body segment.

17. In a wrought metal repair device for pipe lines, a split sleeve comprising a plurality of segments each consisting of a wrought metal body segment of a cylinder provided at each end with segmental end pieces of wrought metal, welded thereto and having segmental recesses forming parts of end packing recesses, formed therein, side flanges of wrought metal welded to said body segments adjacent to their longitudinal edgings, side packings engaging the meeting edges of the body segments, and the end portions of the end segments, bolts for connecting said side flanges, one of said body segments being provided with a vent aperture, a collar located in said aperture, fillets surrounding said collar within and without the wall of said body segment, and welded to the collar and to said body segment, and a vent valve for closing the aperture through said collar.

18. In a wrought metal repair device for pipe lines, a split sleeve comprising a plurality of segments each consisting of a wrought metal body segment of a cylinder provided at each end with segmental end pieces of wrought metal, welded thereto and having segmental recesses forming parts of end packing recesses, formed therein, side flanges of wrought metal welded to said body segments adjacent to their longitudinal edgings, side packings engaging the meeting edges of the body segments, and the end portions of the end segments, bolts for connecting said side flanges, one of said body segments being provided with a vent aperture, a collar located in said aperture and welded to said body segment, and a vent valve connected with said collar for closing said vent aperture, said collar being provided with a valve seat, and having projecting portions on opposite sides of the valve seat, a valve for engaging said seat and provided with lateral projections for engaging the projections of the collar to hold the valve in unseated position, said valve having a stem extending through the collar, a cross piece engaging the opposite end of the collar from the valve and having an aperture to receive the valve stem and clamping means on said valve stem for securing the valve in closed position, whereby said collar and valve form a unit, said collar being located in said vent aperture, and secured to the body segment by welding.

In testimony whereof I affix my signature.

JAMES CLARK.